M. MOSKOWITZ.
SELENIUM CELL REGULATOR.
APPLICATION FILED JUNE 18, 1910.
1,107,438.
Patented Aug. 18, 1914.
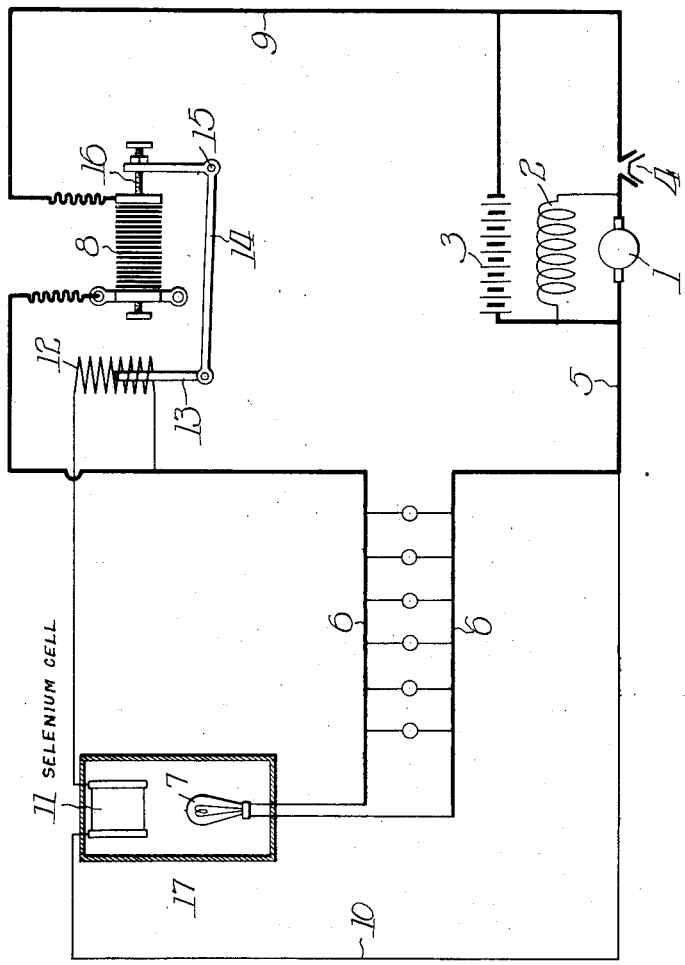

UNITED STATES PATENT OFFICE.

MORRIS MOSKOWITZ, OF NEW YORK, N. Y., ASSIGNOR, BY MESNE ASSIGNMENTS, TO CENTRAL TRUST COMPANY OF NEW YORK, A CORPORATION OF NEW YORK, TRUSTEE.

SELENIUM-CELL REGULATOR.

1,107,438.　　　　Specification of Letters Patent.　　Patented Aug. 18, 1914.

Application filed June 18, 1910. Serial No. 567,612.

*To all whom it may concern:*

Be it known that I, MORRIS MOSKOWITZ, a citizen of the United States, residing at New York city, in the county of New York and State of New York, have invented new and useful Improvements in Selenium-Cell Regulators, of which the following is a full, clear, concise, and exact description, reference being had to the accompanying drawing, forming a part of this specification.

My invention relates to electrical regulators and to circuits therefor.

One of the objects of the invention is to provide improved means for automatically controlling the voltage of a circuit.

Another object is to provide regulating means adapted to be conveniently mounted for inspection and which shall require but little adjustment.

In a lighting system, to which this invention is particularly adapted, one of the main objects is to secure steady, uniform illumination. I propose therefore, to provide regulation which is controlled directly by the illumination itself, rather than by the customary indirect means which bears some relation to the illumination.

In carrying out my invention, I propose to make use of a selenium cell or other element, which has the property of varying its electrical resistance in accordance with the illumination to which it is subjected. It is apparent that a number of instrumentalities may be combined with a selenium cell in order to produce a regulator or a regulating system adapted to any one of a number of varying conditions. In the accompanying drawings I have illustrated a car lighting system which embodies one of the various combinations which may be employed.

Referring to the drawings, there is illustrated diagrammatically, a suitable generator 1, having a shunt field 2, connected in circuit with a storage battery 3. A switch 4 which may be of any suitable type, such for example as the automatic switch used in connection with many car lighting systems, is adapted to close the circuit from the generator to the battery, and the external circuit. The circuit is supplied by the storage battery under normal conditions.

When the generator is running at the proper speed to develop a voltage in excess of that of the battery, the generator will charge the battery and also carry the lamp load. In order to overcome the counter E. M. F. of the battery, a voltage somewhat higher than the battery voltage is required of the generator, and in order that this excess voltage may not be impressed upon the lamp circuit, it is necessary to provide suitable means such as a resistance to control said circuit within the proper limits.

In the system illustrated, the circuit from the battery and generator is through conductor 5, lamp circuit 6, 6, regulating lamp 7, variable resistance 8, conductor 9, and thence back to the battery and generator. The regulating circuit is connected around the lamp circuit and may be traced from conductor 10, through selenium cell 11 and solenoid 12, back to the main circuit. A plurality of cells may be used if desired. The resistance 8 may be of any suitable type, the one illustrated consisting of a series of carbon blocks under pressure and adapted to vary their resistance in accordance with fluctuations in pressure applied to the ends of the series. The solenoid 12 is provided with a plunger 13, which rocks the bell crank lever 14 about its pivot 15, thereby causing the adjustable screw 16 to provide a varying pressure for the carbon blocks. It is obvious that any other suitable resistance mechanism may be employed, the one described being for the purpose of illustration only. Furthermore, although no method of regulation is illustrated in connection with the generator, it is obvious that any one of a number of successful forms of regulation may be employed.

The regulating lamp 7 and the selenium cell 11 are located preferably in a light tight case or receptacle 17, as the resistance of the selenium cell decreases as the light upon it increases, so that it is necessary to shut off all outside sources of light which may effect the operation of the device. The regulating lamp 7 is preferably a carbon filament incandescent lamp adapted to burn well below normal candle power, so that a slight variation in voltage will cause a perceptible fluctuation in the candle power of said lamp. It is obvious that if the regulating lamp used was simply one of the ordinary lamps in the lighting circuit burning under normal conditions, the fluctuations in light necessary to effect the selenium cell would be so great that the object of the regulation would be defeated.

The operation of the system is as follows: When the lighting system is at its minimum or normal voltage, for example 30 volts, the regulating lever 14 will lower of its own weight, thereby compressing the carbon disks 8 so as to reduce to a minimum the resistance in the lamp circuit. When however, the generator speeds up and closes the automatic switch 4 to charge the battery and feed the lamps at the same time, the slight increased voltage on the lamp circuit will increase the candle power of the regulating lamp 7, the light from which lamp, impinging on selenium cell 11, will decrease its resistance, whereby more current will flow through the solenoid 12, causing the coil 13 to be drawn up, thus releasing some of the pressure on the carbon disks 8 and introducing an increased resistance into the lamp circuit, thus checking the tendency of the voltage to rise abnormally. It will be apparent that upon a slight drop in the lamp voltage, a reversal of the above operation will take place, the increased resistance of the selenium cell reducing the current in the solenoid 12, thereby decreasing the resistance of the carbon disks 8. It will be further apparent that the operation will be substantially the same where a plurality of selenium cells are used. It should be noted that the regulating lamp 7 is connected directly across the lamp circuit 6, so that it responds to all fluctuations in the lamp circuit.

While the above invention has been described in connection with a voltage regulator for a lamp circuit, it is apparent that it is not limited to this use, but may be applied wherever regulation is desired depending on a change in the electrical conditions of the circuit to be regulated, whether said change depends on voltage or current and whether a lamp circuit or other circuit is employed. It is further apparent that the invention is not to be limited to the use of an incandescent lamp, as any suitable light emitting translating device may be employed.

Having thus described my invention, what I claim and desire to secure by Letters Patent of the United States is:—

1. A lighting system comprising a main circuit, a variable resistance for controlling said circuit, a branch circuit and an electrically controlled means in said branch circuit for controlling said variable resistance, a controlling lamp in the main circuit, and a light responsive resistance element under control of said lamp arranged to vary the strength of said electrically controlled means, thereby controlling the main circuit.

2. A system of electrical regulation, comprising a main circuit, a variable resistance device therein, electro-magnetically operated controlling means therefor, a lamp in the main circuit, and a light responsive resistance controlled by the intensity of illumination thereof arranged in series with said electro-magnetically controlled means, whereby upon slight variations in the intensity of said light the strength of said controlling means will be varied, and thereby the resistance of the main circuit influenced.

In witness whereof, I have hereunto subscribed my name in the presence of two witnesses.

MORRIS MOSKOWITZ.

Witnesses:
CHAS. G. SMITH,
RAY G. LONDON.